(12) United States Patent
Bischoff et al.

(10) Patent No.: US 7,803,882 B2
(45) Date of Patent: Sep. 28, 2010

(54) SULFUR-CROSSLINKED HYDROGENATED VINYL POLYBUTADIENES, AND USE THEREOF FOR THE PRODUCTION OF TECHNICAL RUBBER ARTICLES HAVING GOOD RECOVERY BEHAVIOR ACROSS A LARGE TEMPERATURE RANGE

(75) Inventors: Andreas Bischoff, Dormagen (DE); Werner Obrecht, Moers (DE)

(73) Assignee: LANXESS Deutschland GmbH, Leverkusen (DE)

( * ) Notice: Subject to any disclaimer, the term of this patent is extended or adjusted under 35 U.S.C. 154(b) by 68 days.

(21) Appl. No.: 12/084,274

(22) PCT Filed: Oct. 31, 2006

(86) PCT No.: PCT/EP2006/010457
§ 371 (c)(1),
(2), (4) Date: Apr. 29, 2008

(87) PCT Pub. No.: WO2007/054228
PCT Pub. Date: May 18, 2007

(65) Prior Publication Data
US 2009/0253892 A1    Oct. 8, 2009

(30) Foreign Application Priority Data
Nov. 12, 2005  (DE)  ......... 10 2005 054 091

(51) Int. Cl.
   *C08F 8/34* (2006.01)
(52) U.S. Cl. ............ 525/332.6; 525/331.9; 525/343; 525/338; 525/332.4
(58) Field of Classification Search ......... 525/338, 525/343, 387, 331.9, 332.6, 329.3, 349
See application file for complete search history.

(56) References Cited

U.S. PATENT DOCUMENTS

| | | | |
|---|---|---|---|
| 4,187,360 A * | 2/1980 | Peters | 525/339 |
| 4,310,582 A | 1/1982 | Stumpe, Jr. | 428/182 |
| 4,965,323 A | 10/1990 | Watanabe et al. | 525/349 |
| 5,342,900 A * | 8/1994 | Wolpers et al. | 525/329.3 |
| 2004/0242797 A1* | 12/2004 | Stere et al. | 525/333.2 |
| 2007/0066763 A1* | 3/2007 | Obrecht et al. | 525/331.9 |

FOREIGN PATENT DOCUMENTS

EP    0 471 250    2/1992

OTHER PUBLICATIONS

W. Hofmann, Vulkanisation & Vulkanisationsmittel, publ. By Bayer AG Leverkusen (1965) 2.3 Vulkanisationsbeschluniger pp. 640-664.
Th. Kempermann, in: Bayer—Mitteilungen fur die Gummi Industrie (Bayer communications for the rubber industry) 50, pp. 29-38 (1978).
Th. Kempermann, in: Bayer—Mitteilungen fur die Gummi Industrie (Bayer communications for the rubber industry) 51, pp. 17-33 (1979).
Th. Kempermann, in: Bayer—Mitteilungen fur die Gummi Industrie (Bayer communications for the rubber industry) 52, pp. 13-23 (1980).
L. H. Davis et al; Rubber Chemistry and Technology 60 125, (1987) "New Curing System Components".

* cited by examiner

*Primary Examiner*—Milton I Cano
*Assistant Examiner*—Michael Leonard
(74) *Attorney, Agent, or Firm*—Jennifer R. Seng; Nicanor A. Kohncke

(57) ABSTRACT

The present invention relates to sulphur-crosslinked hydrogenated vinylpolybutadienes which serve for production of technical rubber items and of tyre components and have very good recovery performance over a wide temperature range.

4 Claims, No Drawings

SULFUR-CROSSLINKED HYDROGENATED VINYL POLYBUTADIENES, AND USE THEREOF FOR THE PRODUCTION OF TECHNICAL RUBBER ARTICLES HAVING GOOD RECOVERY BEHAVIOR ACROSS A LARGE TEMPERATURE RANGE

This application is a U.S. National Phase application under 35 U.S.C. §371 of PCT Application No. PCT/EP2006/010457, filed Oct. 31, 2006, which claims priority under 35 U.S.C. §119 (a)-(d) of German Patent Application No. 10 2005 054091, filed Nov. 12, 2005.

The present invention relates to sulphur-crosslinked hydrogenated vinylpolybutadienes which serve for production of technical rubber items and of tyre components and have very good recovery performance over a wide temperature range.

It is well known that rubbers have to be subjected to chemical crosslinking in order to achieve elastic properties that are technically desirable. This is carried out by way of example during the production of technical rubber items and during the production of tyres. These items are required to have not only high dimensional stability even at high service temperatures but also good resilience under static and dynamic load. The resultant items must generally provide elastic resilience over a wide temperature range.

EPDM rubbers (i.e. polymers based on ethylene/propylene polymers) are an example of a material widely used in industry for production of rubber items with good recovery performance together with good ageing resistance, these being used by way of example to produce hoses, gaskets of any type, profiles, bellows, bearings and dampers, drive belts, couplings, coatings, sheets and coverings, soles, cable sheathing, membranes, tyre components, and conveyor belts, and composites composed of rubber/metal, rubber/plastic and rubber/textile.

EPDM rubber can be crosslinked inter alia via addition of peroxides, addition of sulphur—preferably in combination with suitable accelerator systems—and also via use of high-energy radiation. The conditions of vulcanization and the nature and amount of a respective crosslinking agent have to be selected here in such a way that the elastic recovery performance prescribed by the respective application can actually be achieved. For this, the resilience values for the vulcanizates after compression or shear deformation, even after prolonged exposure, have to be maximized and, respectively, the residual deformation values after compression or shear deformation have to be minimized. The variables relevant in this connection are the compression set to DIN 53517 A and the compressive stress relaxation to DIN 53537.

Continuing technical development in the application sectors mentioned make improved recovery performance over a wide temperature range desirable for the rubber items used.

P 001 00086 says that vulcanizates based on hydrogenated vinylpolybutadienes have this type of property profile if they are crosslinked using peroxides. P 001 00086 does not describe crosslinking of hydrogenated vinylpolybutadienes via use of sulphur.

It was therefore an object of the present invention to arrive at a suitable selection of hydrogenated vinylpolybutadienes with which an appropriate sulphur/accelerator combination can be used to achieve a particular level of vulcanizate properties, such as hardness, elasticity, tensile stress values for various tensile strain values, ultimate tensile strength, tensile strain at break, and particular compression set values, thus permitting compliance with important properties specified for technical use, in particular good recovery performance.

Surprisingly, it has now been found that hydrogenated vinylpolybutadienes also have relatively favourable elastic recovery performance under the conditions of sulphur crosslinking, in particular in comparison with EP(D)M vulcanizates and with rubber items whose constitution and pretreatment is in other respects identical.

The present invention therefore provides sulphur-crosslinked hydrogenated vinylpolybutadienes, characterized in that they have compression set values in the range from
a) 1 to 4.3 at 23° C./70 h,
b) 2 to 22 at 70° C./70 h
c) 5 to 60 at 100° C./70 h
d) 8 to 70 at 125° C./70 h and
e) 10 to 78 at 150° C./70 h
and compressive stress relaxation values in the range from
f) 2 to 8.6 at 23° C./168 h.

Preference is given to sulphur-crosslinked hydrogenated polybutadienes which have compression set values in the range from
a) 1 to 4.3 at 23° C./70 h,
b) 2 to 22 at 70° C./70 h,
c) 5 to 60 at 100° C./70 h
d) 8 to 70 at 125° C./70 h and
e) 10 to 78 at 150° C./70 h
and compressive stress relaxation values in the range from
f) 2 to 8.6 at 23° C./168 h.

The inventive sulphur-crosslinked vinylpolybutadienes also have the following physical properties:
Tensile strain at break: from 400% to 800% at 23° C.
Ultimate tensile strength: from 10 MPa to 16 MPa at 23° C.

Hydrogenated vinylpolybutadienes as generally described in DE 10 324 304 A1 are used for preparation of the inventive sulphur-crosslinked hydrogenated vinylpolybutadienes. In order to achieve the very good recovery performance of the inventively crosslinked hydrogenated vinylpolybutadienes over a wide temperature range, specific hydrogenated vinylpolybutadienes are selected for crosslinking and have a certain property profile, e.g. Mooney values (ML 1+4/125° C.) of from 40 to 150 Mooney units, degrees of hydrogenation of from 70 to 100% and enthalpies of fusion in the range from 0 to 10 J/g.

It is preferable to select hydrogenated vinylpolybutadienes with Mooney values in the range from 60 to 140 Mooney units, degrees of hydrogenation of from 80 to 100% and enthalpies of fusion of from 0 to 5 J/g.

The hydrogenated vinylpolybutadienes to be selected for the inventive sulphur crosslinking can likewise be prepared by the preparation processes described in the Laid-Open German Specification mentioned. By way of example, it is possible that the hydrogenated vinylpolybutadienes to be used as starting products are prepared via anionic polymerization of butadiene with butyllithium or sec-butyllithium in the presence of benzene, of technical hexane mixtures, or cyclohexane as solvent, while setting the required vinyl content by means of additives such as tetramethylethylenediamine, dimethoxyethane, butoxyethoxyethane, THF etc. at temperatures of from 20° C. to 150° C. The hydrogenation of the resultant vinylpolybutadienes can take place by means of a catalyst based on Ni(oct)$_2$/triethylaluminium, Co(oct)$_2$/triethylaluminium, dicyclopentadienyltitanium dichloride/BuLi or dicyclopentadienyltitanium dichloride/triethylaluminium, tris(triphenylphosphine)rhodium(I) chloride (Wilkinson catalyst) etc. in the presence of the abovementioned solvents. The solvent used for the hydrogenation is preferably the same as that used for the preparation of the vinylpolybutadiene, with no isolation of the vinylpolybutadiene (in-situ hydrogenation). Prior to isolation of the hydrogenated polymer from the solution, the hydrogenation catalyst is removed. An antioxidant is also added prior to work-up.

As mentioned above, the specifically selected hydrogenated vinylpolybutadienes are crosslinked with the aid of additives having crosslinking action, in particular of sulphur, peroxides and azo compounds, and also via high-energy radiation. Crosslinking by means of sulphur and accelerators is known to the person skilled in the art and is described in general form by way of example in W. Hofmann, Vulkanisation & Vulkanisationsmittel, publ. by Bayer A G Leverkusen (1965), Th. Kempermann, in: Bayer-Mitteilungen für die Gummi-Industrie [Bayer communications for the rubber industry] 50, 29-38 (1978), 51, 17-33 (1979), 52, 13-23 (1980), L H. Davis, A. B. Sullivan, A. Y. Coran, Rubber Chemistry and Technology 60, 125 (1987), and R. Casper, J. Witte and G. Kuth in Ullmann's Encyklopädie der technischen Chemie [Ullmann's encyclopaedia of industrial chemistry], 4th edn. Volume 13, pp. 640-644 (1977). The above treatises also describe suitable crosslinking agents and accelerators for the sulphur vulcanization of the hydrogenated vinylpolybutadienes.

The crosslinking process can use sulphur in elemental soluble or insoluble form, or else in the form of sulphur donors.

Examples of sulphur donors that can be used are: dimorpholyl disulphide, 2-morpholinodithiobenzothiazole, caprolactam disulphide, dipentamethylenethiuram tetrasulphide, tetramethylthiuram disulphide.

It is also advisable, in addition to sulphur or sulphur donors, to add suitable accelerators during the sulphur vulcanization of the hydrogenated vinylpolybutadienes, in order to obtain industrially viable vulcanization behaviour and, respectively, physical properties adequate for technical purposes, in the vulcanizates. In principle, however, the crosslinking reaction can also take place with sulphur or sulphur donors alone. However, the opposite is also true: the crosslinking of the hydrogenated vinylpolybutadienes can also be carried out with a number of accelerators or accelerator combinations alone and without addition of elemental sulphur or sulphur donors.

The accelerated sulphur crosslinking of the hydrogenated vinylpolybutadienes can use accelerators and crosslinking agents based on: dithiocarbamates, thiurams, thiazoles, sulphenamides, xanthogenates, guanidine accelerators, dithiophosphates and caprolactams.

Examples of dithiocarbamates that can be used are: zinc dimethyldithiocarbamate, zinc diethyldithiocarbamate, zinc dibutyldithiocarbamate, zinc ethylphenyldithiocarbamate, zinc dibenzyldithiocarbamate, zinc pentamethylenedithiocarbamate, tellurium diethyldithiocarbamate, nickel dibutyldithiocarbamate, nickel dimethyldithiocarbamate, zinc diisononyldithiocarbamate, and examples of thiurams that can be used are: tetramethylthiuram disulphide, tetramethylthiurammonosulphide, dimethyldiphenyl-thiuram disulphide, tetrabenzyl-thiuram disulphide, dipentamethylenethiuramtetrasulphide, tetraethylthiuram disulphide, and examples of thiazoles that can be used are: 2-mercaptobenzothiazole, dibenzothiazyl disulphide, zinc mercaptobenzothiazole, benzothiazyldicyclohexylsulphenamide, N-tert-butyl-2-benzothiazolesulphenimide, copper 2-mercaptobenzothiazole, examples of sulphenamide accelerators that can be used are: N-cyclohexylbenzothiazylsulphenamide, N-tert-butyl-2-benzothiazylsulphenamide, benzothiazyl-2-sulphenic morpholide, N-dicyclohexyl-2-benzothiazylsulphenamide, 2-morpholinobenzothiazylsulphenamide, 2-morpholinodithiobenzothiazole, N-oxydiethylenethiocarbamyl-N-tert-butylsulphenamide, oxydiethylenethiocarbamyl-N-oxydiethylenesulphenamide, and examples of xanthogenate accelerators that can be used are: sodium dibutyl xanthogenate, zinc isopropyl dibutyl xanthogenate, zinc dibutyl xanthogenate, and examples of guanidine accelerators that can be used are: diphenylguanidine, di-o-tolylguanidine, o-tolylbiguanide, and examples of dithiophosphates that can be used are: zinc dialkyl dithiophosphates (chain length of alkyl radicals $C_2$ to $C_{16}$), copper dialkyl dithiophosphates (chain length of alkyl radicals $C_2$ to $C_{16}$), dithiophosphoryl polysulphide, and an example of caprolactams that can be used is dithiobiscaprolactam, and examples of other accelerators that can be used are: zinc diaminodiisocyanate, hexamethylenetetramine, 1,3-bis (citraconimidomethyl)benzene, and cyclic disulphanes.

The above accelerators and crosslinking agents can be used either individually or else in a mixture. The following substances are preferably used for the crosslinking of the hydrogenated vinylpolybutadienes: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphates, dimorpholyl disulphide, tellurium diethyldithiocarbamate, nickel dibutyldithiocarbamate, zinc dibutyldithiocarbamate, zinc dimethyldithiocarbamate, dithiobiscaprolactam.

The crosslinking agents and accelerators can respectively be used in amounts of from about 0.05 to 10 phr, preferably from 0.1 to 8 phr, in particular from 0.5 to 5 phr (individual addition, in each case based on the active substance).

The inventive sulphur crosslinking of the hydrogenated vinylpolybutadienes almost always also requires, in addition to the vulcanization accelerators or crosslinking agents, concomitant use of inorganic or organic activators, such as: zinc oxide, zinc carbonate, lead oxide, magnesium oxide, saturated or unsaturated organic fatty acids and their zinc salts, polyalcohols, amino alcohols, e.g. triethanolamine, and amines, such as dibutylamine, dicyclohexylamine, cyclohexylethylamine and polyetheramines.

The vulcanization behaviour in the inventive sulphur crosslinking of the hydrogenated vinylpolybutadienes can also—where technically necessary or desirable—be influenced via suitable retarders. Examples of substances used for this are: N-(cyclohexylthio)phthalimide, phthalic anhydride, N-phenyl-N-(trichloromethylsulphenyl)benzylsulphenamide, benzoic acid and salicylic acid.

Amounts of from about 0.1 to 12 phr, preferably from 0.2 to 8 phr, particularly preferably from 0.5 to 5 phr, of activators and retarders can be used.

Other known auxiliaries and additives can also be used in the inventive sulphur crosslinking of the hydrogenated vinylpolybutadienes. By way of example, mention may be made of antioxidants, fillers, filler activators, plasticizers or mould-release agents.

Sulphur vulcanizates composed of hydrogenated vinylpolybutadienes can also be protected from various environmental effects, for example exposure to heat, UV light, ozone and dynamic fatigue, via addition of antioxidants.

Antioxidants that can be used are in particular:

p-phenylenediamines, e.g. N-isopropyl-N'-phenyl-p-phenylenediamine, N-(1,3-dimethylbutyl)-N'-phenyl-p-phenylenediamine and N,N'-di(1,4-dimethylpentyl)-p-phenylenediamine, secondary aromatic amines, e.g. oligomerized 2,2,4-trimethyl-1,2-dihydroquinoline (TMQ), styrenated diphenylamine (DDA), octylated diphenylamine (OCD) and phenyl-α-naphthylamine (PAN), mercapto compounds, such as 2-mercaptobenzimidazole, 4- and 5-methylmercaptobenzimidazole (MB2) or their zinc salts (ZMB2).

Alongside these, it is also possible to use the known phenolic antioxidants, such as sterically hindered phenols. It is also possible to use a combination of the above antioxidants.

The usual amounts used of the antioxidants are from about 0.1 to 8 phr, preferably from 0.3 to [5 phr, based on the total amount of polymer.

Examples of mould-release agents which can be used are: saturated and partially unsaturated fatty and oleic acids and their derivatives (fatty acid esters, fatty acid salts, fatty alcohols, fatty acid amides), these preferably being used as a constituent of a mixture, and also products which can be applied to the mould surface, e.g. products based on low-molecular-weight silicone compounds, products based on fluoropolymers and products based on phenolic resins.

The amounts used of the mould-release agents as a constituent of a mixture are from about 0.2 to 10 phr, preferably from 0.5 to 5 phr, based on the total amount of polymer.

Examples of fillers which can be used are carbon black, silica, calcium carbonate, barium sulphate, zinc oxide, magnesium oxide, aluminium oxide, iron oxide, diatomaceous earth, cork flour and/or silicates. The selection of the fillers depends on the property profile to be established for the vulcanizates. In the event that the vulcanizates are, for example, to be rendered flame-retardant, it is advisable to use appropriate hydroxides, such as aluminium hydroxide, magnesium hydroxide, calcium hydroxide, and hydrous salts, in particular salts which comprise water in the form of water of crystallization.

The amounts generally used of the fillers are from about 1 to 150 phr. It is, of course, possible to use a very wide variety of fillers in a mixture with one another.

Filler activators can also be added together with the fillers in order to achieve certain product properties and/or certain vulcanization properties. The filler activators can be added during preparation of the mixture. However, it is also possible to treat the filler with filler activator before it is added to the rubber mixture. To this end, organic silanes can be used, examples being bis(triethoxysilylpropyl)polysulphane, vinyltrimethoxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltri-methoxysilane, methyltriethoxysilane, dimethyldimethoxysilane, dimethyldiethoxysilane, trimethylethoxysilane, isooctyltrimethoxysilane, isooctyltriethoxysilane, hexadecyltri-methoxysilane or (octadecyl)methyldimethoxysilane. Examples of other filler activators are surfactants, such as triethanolamine and ethylene glycols having molar masses of from 74 to 10 000 g/mol.

The vulcanizates can also be reinforced via addition of reinforcing materials, such as glass fibres, fibres composed of aliphatic and aromatic polyamides, e.g. Aramid®, polyester fibres, polyvinyl alcohol fibres, cellulose fibres, natural fibres, e.g. cotton or wood fibres or textiles composed of cotton, polyester, polyamide, glass cord and steel cord. These reinforcing materials or short fibres must, if appropriate, be modified to improve adhesion prior to their use (e.g. via RFL dip), in order to permit firm bonding to the elastomer.

Plasticizers which can be used are amounts of up to 100 phr of the usual mineral oils.

It is, of course, also possible for other additives and auxiliaries to be added to the vulcanizates if this should be necessary for the property profile of the inventively crosslinked hydrogenated vinylpolybutadienes.

It is also possible to use the inventive vulcanizates to produce composite articles with steel, with thermoplastics and with thermosets. The composite is produced either during the vulcanization process, if appropriate with the use of a suitable coupling agent system or after prior activation (e.g. etching, plasma activation) of the substrate or else via adhesive bonding after vulcanization.

The hydrogenated vinylpolybutadienes to be used according to the invention are mixed with the abovementioned additives prior to the vulcanization process in the usual assemblies, such as internal mixers or extruders, or on rolls.

The mixture can be processed in a known manner, for example by calendaring, transfer moulding, extrusion or injection moulding. The processing temperature is to be selected in such a way as to prevent premature vulcanization. Appropriate preliminary experiments can be carried out to achieve this.

The ideal temperature for carrying out the vulcanization process naturally depends on the reactivity of the crosslinking system used, and in the present case is from room temperature (about 20° C.) to about 220° C., if appropriate at elevated pressure. The crosslinking times are generally from 20 seconds to 60 minutes, preferably from 30 seconds to 30 minutes.

The vulcanization reaction itself can be carried out conventionally, in vulcanization presses or in autoclaves, or in the presence of hot air, microwaves or other high-energy radiation (e.g. UV radiation or IR radiation), or else in a salt bath.

In order to achieve certain product properties or in order to complete the vulcanization process, subsequent heat-conditioning can be necessary. In these cases, the temperatures used for subsequent heat-conditioning are in the range from 60° C. to 220° C. for a period of from about 2 minutes to 24 h, if appropriate at reduced pressure.

EXAMPLES

1. Hydrogenated Vinylpolybutadiene Products (HVIBR) and EPDM Comparative Products Studied The starting materials for the hydrogenated vinylpolybutadienes (vinylpolybutadiene feedstocks) used for the studies below were prepared in accordance with the teaching of DE 10324304 A1.

The fundamental properties of the hydrogenated vinylpolybutadiene products used in the examples below have been collated in Table 1.1 below:

TABLE 1.1

| | Fundamental properties of hydrogenated HVIBR grades | | | | | | |
|---|---|---|---|---|---|---|---|
| Rubber | ML1 + 4/ 125° C. [MU] | Vinyl content (in feedstock) [%] | Degree of hydrogenation [%] | DH [J/g] | Tg [° C.] | Ethylene content [%] | ENB content [%] |
| HVIBR 96 | 90 | 49.3 | 96.2 | 0 | −61 | — | — |
| HVIBR 94 | 136 | 47.5 | 94.1 | 2.7 | −60 | — | — |
| HVIBR 85 | 78 | 50 | 85 | 0 | −62 | — | — |

The compounding properties and vulcanizate properties of the hydrogenated vinylpolybutadienes are compared with those of well-known EPDM rubbers. EPDM grades Buna® EP G 5450 and Buna® EP G 3440 are commercially available products from Lanxess Deutschland GmbH. Table 1.2 attached collates important fundamental data for these EPDM grades.

TABLE 1.2

Fundamental properties of EPDM comparative products

| Rubber | ML1 + 4/ 125° C. [MU] | Vinyl content (in feedstock) [%] | Degree of hydrogenation [%] | DH [J/g] | Tg [° C.] | Ethylene content [%] | ENB content [%] |
|---|---|---|---|---|---|---|---|
| Buna ® EPG 5450 | 46 | — | — | 0.56 | −53.3 | 52 | 4.3 |
| Buna ® EP G 3440 | 28 | — | — | 0 | −52.2 | 48 | 4.1 |

2. Preparation, Vulcanization and Characterization of Rubber Mixtures

Three hydrogenated vinylpolybutadiene grades are compared with two EPDM grades on the basis of the properties of the unvulcanized compounded materials and of the vulcanized compounded materials.

2.1. Preparation of Rubber Mixtures

An internal mixer of capacity 1.5 l and having "intermeshing rotor geometry" (GK 1.5E from Werner & Pfleiderer) was used for preparation of the rubber mixtures. First, in each case the rubber (HVIBR or EPDM) was charged to the mixer. After 30 s, all of the further components other than the sulphur and the accelerators were added, and the mixture was mixed at a constant rotor rotation rate of 40 rpm. After a mixing time of 4 min, the mixture was discharged and cooled to room temperature in air. The sulphur and the accelerators were then incorporated by roll-mixing at 40° C.

2.1: Constitution of Rubber Mixtures

| Rubber mixture no.: | | 2.1.1 | 2.1.2 | 2.1.3 | 2.1.4 | 2.1.5 |
|---|---|---|---|---|---|---|
| HVIBR 96 | [phr] | 100 | | | | |
| HVIBR 94 | [phr] | | 100 | | | |
| HVIBR 85 | [phr] | | | 100 | | |
| Buna EP G 5450 | [phr] | | | | 100 | |
| Buna EP G 3440 | [phr] | | | | | 100 |
| Corax ® N 550[1] | [phr] | 80 | 80 | 80 | 80 | 80 |
| Sunpar ® 2280[2] | [phr] | 50 | 50 | 50 | 50 | 50 |
| Vulkanox ® HS[3] | [phr] | 1 | 1 | 1 | 1 | 1 |
| Polyglykol ® 4000 S[4] | [phr] | 1 | 1 | 1 | 1 | 1 |
| Zinc oxide[5] | [phr] | 5 | 5 | 5 | 5 | 5 |
| Stearic acid[6] | [phr] | 1 | 1 | 1 | 1 | 1 |
| MBT[7] | [phr] | 0.5 | 0.5 | 0.5 | 0.5 | 0.5 |
| TMTD[8] | [phr] | 1 | 1 | 1 | 1 | 1 |
| Sulphur[9] | [phr] | 1.5 | 1.5 | 1.5 | 1.5 | 1.5 |

[1]Specified carbon black from Degussa AG
[2]Mineral oil plasticizer from Sunoco Rubber & Chemical
[3]2,2,4-Tetramethyl-1,2-dihydroquinoline, polymerized (Vulkanox ® HS from Lanxess Deutschland GmbH)
[4]Polyethylene glycol from Clariant
[5]Rotsiegel zinc white from Grillo Zinkoxid GmbH
[6]Edenor ® C18 98-100 from Cognis Deutschland GmbH
[7]2-Mercaptobenzothiazole (Vulkacit ® mercapto/C from Lanxess Deutschland GmbH)
[8]Tetramethylthiuram disulphide (Vulkacit ® thiuram/C from Lanxess Deutschland GmbH)
[9]Chancel 90/95° ground sulphur from Solvay Deutschland GmbH The following values were determined on the unvulcanized rubber mixtures:

2.2: Properties of Rubber Mixtures

Vulcanization performance of the mixtures was studied to ASTM D5289 at 160° C. using a test time of 30 minutes with the aid of an MDR2000 Moving Die Rheometer from Alpha Technology. The characteristic vulcameter values $F_a$, $F_{max}$, $F_{max}-F_a$, $t_{10}$, $t_{50}$, $t_{90}$ and $t_{95}$ were thus determined.

2.3: Vulcanization Performance of Rubber Mixtures

| Rubber mixture no.: | | 2.3.1 | 2.3.2 | 2.3.3 | 2.3.4 | 2.3.5 |
|---|---|---|---|---|---|---|
| $F_a$ | [dNm] | 1.87 | 2.18 | 1.89 | 1.2 | 0.76 |
| $F_{max}$ | [dNm] | 16.91 | 14.06 | 17.07 | 19.00 | 17.23 |
| $F_{max} - F_a$ | [dNm] | 15.04 | 11.88 | 15.18 | 17.80 | 16.47 |
| $t_{10}$ | [min] | 1.09 | 0.90 | 0.84 | 1.50 | 1.61 |
| $t_{50}$ | [min] | 2.22 | 1.59 | 1.35 | 3.00 | 3.59 |
| $t_{90}$ | [min] | 8.73 | 5.73 | 4.22 | 11.3 | 12.53 |
| $t_{95}$ | [min] | 12.65 | 8.54 | 7.49 | 15.67 | 16.68 |

According to DIN 53 529, Part 3, the definitions are:

$F_a$: vulcameter value indicated at minimum of crosslinking isotherm $F_{max}$: maximum vulcameter value indicated $F_{max} - F_a$: difference between maximum and minimum of vulcameter values indicated $t_{10}$: juncture at which 10% of final conversion has been achieved $t_{50}$: juncture at which 50% of final conversion has been achieved $t_{90}$: juncture at which 90% of final conversion has been achieved $t_{95}$: juncture at which 95% of final conversion has been achieved The mixtures were vulcanized in a plate press at a pressure of 170 bar at 160° C. with the $t_{95}$ times stated in Tab. 2.3.

The following test values were determined on the unaged vulcanizates at 23° C. and 70° C.

| Rubber mixture no.: | | 2.2.1 | 2.2..2 | 2.2.3 | 2.2.4 | 2.2.5 |
|---|---|---|---|---|---|---|
| Mooney viscosity (ML1 + 4/100° C.) to ASTM D1646 | [MU] | 71 | 74 | 68 | 56 | 38 |
| Mooney relaxation (MR) to ISO 289, Part 4 | [%] | 3.7 | 9.3 | 6.3 | 4.8 | 4.7 |

2.4: Vulcanizate Properties of Rubber Mixtures

| Rubber mixture no.: | | 2.4.1 | 2.4.2 | 2.4.3 | 2.4.4 | 2.4.5 |
|---|---|---|---|---|---|---|
| Shore A hardness at 23° C./DIN 53505 | [ShA] | 61 | 58 | 61 | 61 | 60 |
| Shore A hardness at 70° C./DIN 53505 | [ShA] | 60 | 57 | 59 | 59 | 59 |
| Rebound elasticity at 23° C. to DIN 53512 | [%] | 49.0 | 50.5 | 52.0 | 51.8 | 58.0 |
| Rebound elasticity at 70° C. to DIN 53512 | [%] | 62.3 | 62.0 | 65.0 | 61.7 | 58.5 |
| Tensile stress value at 25% tensile strain ($\sigma_{25}$) 23° C./DIN 53504 | [MPa] | 0.78 | 0.73 | 0.80 | 0.83 | 0.77 |
| Tensile stress value at 100% tensile strain ($\sigma_{100}$) 23° C./DIN 53504 | [MPa] | 2.8 | 2.6 | 2.9 | 2.4 | 2.4 |
| Tensile stress value at 300% tensile strain ($\sigma_{300}$) 23° C./DIN 53504 | [MPa] | 8.0 | 9.2 | 8.7 | 7.8 | 7.1 |
| Tensile strength ($\sigma_{max}$) 23° C./DIN 53504 | [MPa] | 11.9 | 15.2 | 11.0 | 14.7 | 14.0 |
| Tensile strain at break ($\epsilon_b$) 23° C./DIN 53504 | [%] | 479 | 532 | 404 | 529 | 566 |
| Compression set after 70 h/23° C. (DIN 53517 A) | [%] | 3.5 | 4.0 | 3.9 | 4.7 | 6.4 |
| Compression set after 70 h/70° C. (DIN 53517 A) | [%] | 14.0 | 14.9 | 18.1 | 26.9 | 31.6 |
| Compression set after 70 h/100° C. (DIN 53517 A) | [%] | 55.1 | 48.3 | 50.8 | 70.1 | 76.8 |
| Compression set after 70 h/125° C. (DIN 53517 A) | [%] | 63.9 | 60.6 | 54.3 | 79.8 | 86.7 |
| Compression set after 70 h/150° C. (DIN 53517 A) | [%] | 71.6 | 69.2 | 62.7 | 84.7 | 91.5 |
| Compressive stress relaxation after 168 h at 23° C. (DIN 53537) | [%] | 7.5 | 8.3 | 8.5 | 8.8 | 14.2 |

The physical parameters were determined to the appropriate DIN, ISO or ASTM specifications. Kleemann, Weber, Formeln und Tabellen für die Elastomerverarbeitung [Formulae and tables for elastomer processing], Dr. Gupta Verlag, 1994 is used as supplementary reference.

3. Discussion of Results

The inventive examples show that the values for compression set over a wide temperature range, and the values for compressive stress relaxation, are more favourable for the sulphur-vulcanized rubber mixtures composed of hydrogenated vinylpolybutadiene than for the comparative examples, while the level of the other mechanical properties of the HVIBR vulcanizates is at about the same order of magnitude as that of the EPDM comparative examples.

What is claimed is:

1. A sulphur-crosslinked hydrogenated vinyl-polybutadiene, having compression set values in the range from
   a) 1 to 4.3% at 23° C./70 h,
   b) 2 to 22% at 70° C./70 h
   c) 5 to 60% at 100° C./70 h
   d) 8 to 70% at 125° C./70 h and
   e) 10 to 78% at 150° C./70 h
   and compressive stress relaxation values in the range from
   f) 2 to 8.6% at 23° C./168 h and
   said sulphur-crosslinked hydrogenated vinyl-polybutadiene prepared by crosslinking a hydrogenated vinyl-polybutadiene via sulphurs or in the form of sulphur donors, said hydrogenated vinyl-polybutadiene having a degree of hydrogenation in the range from 70 to 100%, a Mooney unit from 40 to 150 (ML 1+4/125° C.) and an enthalpy of fusion in the range from 0 to 10 J/g.

2. A technical rubber product, comprising the sulphur-crosslinked hydrogenated vinyl-polybutadiene of claim 1.

3. A dynamically loaded tire component, comprising the sulphur-crosslinked hydrogenated vinyl-polybutadiene of claim 1.

4. A conveyor belt, hose, gasket of any type, profile, bellow, sealing collar, valve, protective cap, bearings and damper, coupling, drive belt, coating, sheet and covering, sole, cable sheathing, membrane or composite composed of rubber/metal, rubber/plastic and rubber/textile, comprising the sulphur-crosslinked hydrogenated vinyl-polybutadiene of claim 1.

* * * * *